2,794,044
SYNTHESIS OF IMINODIACETONITRILE

William R. Miller, Niagara Falls, N. Y., assignor to E. I. du Pont de Nemours and Company, Wilmington, Del., a corporation of Delaware No Drawing. Application August 30, 1955, Serial No. 531,597

5 Claims. (Cl. 260—465.5)

This invention relates to a novel and useful process for making iminodiacetonitrile, $HN(CH_2CN)_2$.

Heretofore a variety of methods has been proposed for synthesizing iminodiacetonitrile. Thus, Eschweiler, Ann. 278, 229–396 (1894), and Dubsky et al., Ber. 54, 2659–67 (1921), reacted hydrogen cyanide with hexamethylenetetramine to yield iminodiacetonitrile. This preparation is unsatisfactory commercially for the reason that it requires several days for completion.

More recently Thompson, U. S. Patent 2,511,487 (1950), has developed a synthesis of iminodiacetonitrile by reacting aminoacetonitrile with formaldehyde cyanhydrin. Good yields result from this procedure. The starting materials are, however, rather complex and require separate syntheses for their production.

A general object of this invention is, consequently, provision of a novel and useful method for preparing iminodiacetonitrile.

Another object is provision of a method for making iminodiacetonitrile cheaply from simple and readily available materials.

A further object is provision of a single-step synthesis of iminodiacetonitrile from simple compounds.

The above-mentioned and still further objects are achieved in accordance with this invention by a process in which molecular ammonia, formaldehyde and hydrogen cyanide are reacted in slightly acidified aqueous solution.

The physical manipulations required for carrying out the process are very simple. The reactants are merely mixed together in approximately stoichiometric ratio in acidified solution and allowed to stand at a relatively low temperature for several hours. The most important factors involved in the process are the reactants themselves and the mole ratios thereof, the pH of the solution and the reaction temperature. Pressure is of no critical importance.

The obvious equation for the reaction producing iminodiacetonitrile is:

(1) 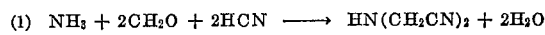

$$NH_3 + 2CH_2O + 2HCN \longrightarrow HN(CH_2CN)_2 + 2H_2O$$

When, however, the reactants are mixed in the stoichiometric ratio demanded by this equation no product can be isolated regardless of the pH adjustment. The following different equation expresses the stoichiometric ratios necessary to obtain the best yield, ca. 65%:

(2) 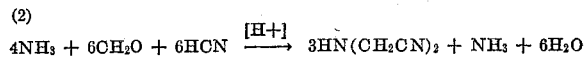

$$4NH_3 + 6CH_2O + 6HCN \xrightarrow{[H+]} 3HN(CH_2CN)_2 + NH_3 + 6H_2O$$

Equation 2 should not be used as a basis for postulating any particular reaction mechanism as still other reactions are possible. A third reaction might, for example, produce aminoacetonitrile in addition to iminodiacetonitrile although none of the former compound has been isolated from any run.

As pointed out, Equation 2 expresses the stoichiometric ratio of the reactants necessary. The molar ratio $NH_3:CH_2O:HCN$ should, therefore, be initially 2:3:3. This ratio should be adhered to as closely as possible. Some reaction can still be obtained if any one of the ingredients departs from the ratio by about 0.15 mole but this tolerance should not be exceeded. Excess materials will, of course, be lost if any departure from the stoichiometric ratio is permitted.

The concentration of reactants in the solution is not of great criticality. Excessive dilution should, however, be avoided to facilitate recovery of the product. A solution comprising 25–75% by weight of water is in general satisfactory.

Usually the ammonia and formaldehyde will be supplied as aqueous solutions of the respective commercial varieties. Thus, 28% ammonia and 37% formaldehyde solutions are perfectly satisfactory. Other ammonia solutions or the anhydrous gas can, however, be substituted if it is so desired. More highly concentrated formaldehyde solutions are also acceptable substitutes as is the gaseous monomer. Solid formaldehyde polymers which yield formaldehyde under the reaction condition may also be used. Although hydrogen cyanide is probably most conveniently produced and used as the anhydrous gas, liquid hydrogen cyanide or aqueous solutions of hydrocyanic acid can be employed.

The reacting solution must be slightly acid within relatively narrow limits. The pH must, therefore, be sharply controlled at between about 5.5 and 6.5. Control can be achieved by the use of any acid which does not interfere with the reaction desired. Mineral acids such as hydrochloric, phosphoric and sulfuric acid are particularly useful. Hydrochloric acid is preferred. The pH of the solution can readily be determined as on a Beckman pH meter.

The reaction temperature may be varied to some extent but should be rather low to prevent loss of ammonia and hydrogen cyanide. Between room and ice temperature is preferred although up to about 50° C. can be employed after the addition of hydrogen cyanide (B. P. 27° C. at 760 mm. of mercury pressure). Temperatures below 0° C. can also be used but are difficult to maintain and unnecessary. When the reaction is complete the product is most easily recovered by crystallization at around 0° C.

The time required for maximum reaction is not sharply critical. At the preferred temperature of around 0–25° C. however, between about 10 and 24 hours are required. Around 20 hours is generally adequate at room temperature.

As noted above, the product is readily removed from solution by crystallization. Since it contains some impurities it is then preferably recrystallized. Any suitable solvent, the lower alcohols such as methanol and ethanol in particular, can be used for the recrystallization.

The invention is illustrated in more detail by the example which follows. In this example all percentages are by weight.

Example

A 5-liter, 3-necked flask was placed in an ice bath. A stirrer, a thermometer and a dropping funnel were inserted in the necks of the flask but the latter was left open to the atmosphere. 486 g. of 28% aqueous ammonia was placed in the flask, the stirrer was started and the ammonia was cooled to about 5° C. 974 g. of 37% aqueous formaldehyde was added to the ammonia at a rate adjusted to keep the temperature at about 20° C. 324 g. of anhydrous hydrogen cyanide was then rapidly added to the mixture followed by 90 ml. of concentrated hydrochloric acid. The pH of the mixture was finally adjusted to 5.5 with sodium hydroxide solution. The ice in the bath was allowed to melt and the stirrer stopped.

The mixture was allowed to stand overnight, i. e., for about 20 hours. It was then cooled with stirring and the crystallized iminodiacetonitrile filtered off. When dried, the coarse gray crystals weighed 366 g., a yield of 64.2%. After one recrystallization from ethanol the compound melted at 77–79° C. and gave no depression in the melting point of an authentic sample of iminodiacetonitrile.

Having described my invention, I claim:

1. The process for the synthesis of iminodiacetonitrile which comprises reacting together ammonia, formaldehyde and hydrogen cyanide in the molar ratio of about 2:3:3 in aqueous acid solution having a pH between about 5.5 and 6.5 and a temperature in the range 0° to 50° C.

2. The process of claim 1 in which the reaction temperature is about 0–25° C.

3. The process of claim 1 in which the pH is controlled by use of a mineral acid selected from the group consisting of hydrochloric acid, phosphoric acid and sulfuric acid.

4. The process of claim 1 in which the reaction time is about 10–24 hours.

5. The process of claim 1 including the additional step of recovering iminodiacetonitrile from the solution.

References Cited in the file of this patent

UNITED STATES PATENTS

| | | |
|---|---|---|
| 2,405,966 | Loder | Aug. 20, 1946 |
| 2,511,487 | Thompson | June 13, 1950 |
| 2,589,208 | Craig et al. | Mar. 18, 1952 |
| 2,605,263 | Culver et al. | July 29, 1952 |